April 30, 1968 R. H. DEAN 3,380,620

VENT DEVICE

Filed Sept. 30, 1966

INVENTOR

ROY H. DEAN

BY *Olsen and Stephenson*

ATTORNEYS

United States Patent Office 3,380,620
Patented Apr. 30, 1968

3,380,620
VENT DEVICE
Roy H. Dean, Dearborn, Mich., assignor to Roy Dean Products Company, Dearborn, Mich., a corporation of Michigan
Filed Sept. 30, 1966, Ser. No. 583,277
6 Claims. (Cl. 220—44)

ABSTRACT OF THE DISCLOSURE

A rear axle housing apparatus for an automobile which includes an axle shaft and the housing therefor between which a grease lubricant is filled. A vent device is mounted on the housing to permit escape of air from the housing when thermal expansion of the lubricant and trapped air therein occurs as a result of temperature variations in the axle assembly which arise during normal driving conditions.

---

The present invention relates to a vent device, and more particularly to such a device intended for use in connection with the rear axle housing of an automobile or with other structures having similar requirements.

As is well known, a rear axle housing and its contents are subjected to wide variations in temperature both from external causes such as weather conditions and from internal causes such as frictional heat developed during operation of the vehicle. The housing contains lubricants and some air, and it is important that the housing be vented so as to equalize the internal and external air pressure during such temperature changes. By so doing, harmful effects to the bearing seals and the like can be prevented.

Various arrangements can be provided to compensate for such temperature changes, including the use of a vent tube and cap assembly which is constructed and arranged so that the tube can be secured in a hole in the housing to allow breathing, and the cap is retained loosely on the outer end of the tube to prevent dust and other undesirable conaminants from entering the housing.

Assemblies of this character have not proved to be entirely satisfactory, and it is an object of the present invention to provide an improved vent device for use in a rear axle housing, which device is constructed and arranged so that it will not readily become clogged with the lubricant or with other contaminants from external sources.

It is another object of the present invention to provide a vent device of the foregoing character which can be inserted easily into place in the hole of the housing and which is characterized by its one-piece construction.

In accordance with one form of the present invention, a vent device is provided which is adapted to fit into a hole in a rear axle housing comprising a lower portion adapted to be pressed into the hole and an upper portion of enlarged transverse dimensions for seating on the external peripheral edge of the hole. The lower portion is constructed so that it defines a vent passageway which at its lower end is closed at the bottom and rearward side and open in a forward direction and which at its upper end communicates with said upper portion. The upper portion defines a continuation of said vent passageway which at its upper end is closed at the top and forward side and is open in a rearward direction.

The vent device is an integral one-piece construction which can easily be pressed into the hole in the housing. A plurality of forms of the invention can be made, one of which has a lower portion which is circular in cross section and which has an upright reinforcing panel extending vertically throughout the passageway. This embodiment of the invention will have protrusions on opposite sides of the lower portion which are spaced below the upper portion so that the lower portion can be pressed into the hole and the protrusions will snap into place below the wall of the housing so as to retain the vent device in the hole. In order to improve the flexible characteristics of the sides of the lower portion so as to facilitate snapping of the protrusions into place, it is contemplated that slots can be cut in the side walls so as to render the side walls more flexible.

It is also contemplated that various arrangements can be used to prevent the vent device from being inserted improperly into the hole. One such arrangement provides for the reinforcing panel to project outwardly from the passageway beyond the normal confines of the wall of the lower portion, and the hole in the housing will have a slot for receiving the projected end of the panel. This arrangement will assure that the vent device is positioned in the hole facing the proper direction and will assure that the vent device does not turn of its own accord in the hole.

Other forms of the vent device are also contemplated wherein the lower portion of the vent device will have a cross-sectional configuration other than circular so that the vent device will necessarily have to be inserted in a hole in proper alignment and will be retained therein because of the noncircular configuration.

Other objects of this invention will appear in the following description and appended claims, reference being had to the accompanying drawing forming a part of this specification wherein like reference characters designate corresponding parts in the several views.

Figure 1:
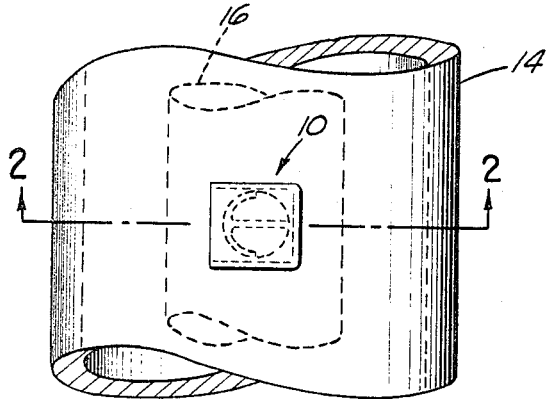
FIGURE 1 is a fragmentary top plan view of a housing in which a vent device embodying the present invention is inserted.
Figure 3:
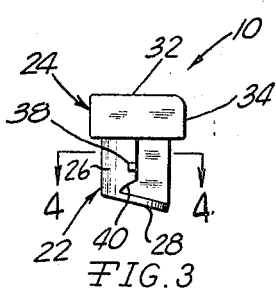
FIGURE 3 is a side elevational view of the vent device shown in FIGURE 1.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the embodiment of the invention illustrated in FIGURES 1–4 will first be described. The vent device 10 is shown mounted in the circular hole 12 in the rear axle housing 14. The latter also houses the rear axle shaft 16 as well as the lubricant which is packed between the shaft 16 and the housing 14. In the normal forward operation of the vehicle the shaft 16 will rotate in a clockwise direction as indicated by the arrow 18. This occurs when the vehicle is traveling in a direction to the right with respect to FIGURE 2, as indicated by the directional arrow 20.

As previously indicated, one of the problems that is encountered in motor vehicles arises because of the wide variation of temperatures to which the grease and air between the shaft 16 and the housing 14 are subjected. When the temperature of the lubricant and the air is raised to relatively high temperatures, the thermal expansion that occurs with respect to the lubricant and the air will have the effect of forcing the lubricant in an outward direction at the bearing seals and the like, and this can damage the seals and will also result in leakage of the lubricant from the housing. In order to overcome this problem, a vent device such as the vent device 10 is required.

The vent device 10 has a lower portion 22 and an upper portion 24. The hole 12 in the housing 14 is circular in cross section and the lower portion 22 has a circular wall section 26 which is semi-circular so as to provide a closed wall on the rearward side of the device. A bottom wall 28 is also provided for closing the bottom of the device, and this wall 28 is also circular so that the device can be pressed through the opening of the circular hole 12. From this description it will be understood that a passageway 30 is defined in the lower portion 22 which is closed at the bottom and rearward sides and open in a forward direction so that air under pressure within the housing 14 can readily pass upward through the passageway to equalize the pressure on the external and internal sides of the housing 14.

The upper portion 24 has a larger transverse dimension than that of the opening 12 so as to limit the extent to which the vent device 10 can be pressed into the hole 12. The upper portion 24 has a closed top wall 32 and closed walls on opposite sides and on the forward side 34. Thus, the upper portion defines a continuation of the vent passageway 30, and such continuation is closed at the top and forward sides and is open in a rearward direction to permit breathing of air through the passageway.

In order to reinforce the various sides, bottom and top, a reinforcing panel extends in a vertical upright direction through the passageway 30 and engages the bottom wall 28, the rear wall 26, the top wall 32 and the front wall 34. It will be recognized that the reinforcing panel 36 in no way interferes with the breathing action through the passageway 30.

Figure 2:
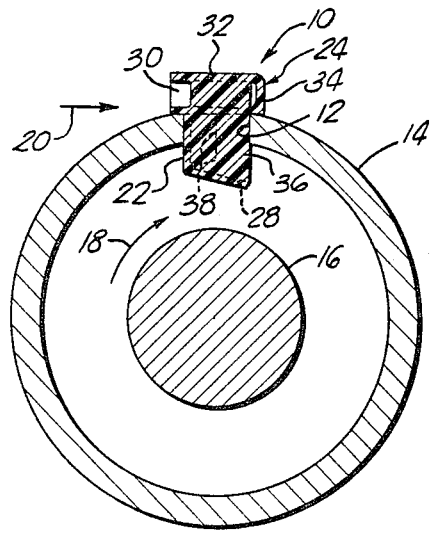
FIGURE 2 is a sectional view taken on the line 2—2 of FIGURE 1.

In the normal operation of the embodiment illustrated in FIGURES 1 and 2, the axle shaft 16 rotates in the direction indicated by the arrow 18 which has the effect of urging the lubricating grease only against the rearward and bottom sides of the device 10, and these wall surfaces will prevent the lubricant from entering the passageway 30. However, air which may be in the housing 14 may freely pass through the passageway 30 via the opening on the forward side of the device 10, which opening is not exposed to the pressures of the lubricant within the housing 14. When the vehicle is traveling in the forward direction the forward wall 34 will prevent water, dirt and the like from entering the passageway, but the rearward opening from the housing will permit normal free breathing to occur.

For the purpose of retaining the device 10 in the hole 12, it is preferred to have protuberances or lateral projections 38 on the external surface of the wall 26 and on opposite sides of the device 10. These projections are located a sufficient distance below the upper portion 24 so that they can be snapped over the edge of the wall of housing 14 for retaining the device in place. In order to render the wall 26 more flexible at its edge so as to facilitate snapping the device 10 in place on the housing 14, it is preferred that the wall 26 have a notch 40 below the projections 38 on both sides of the device 10. This notch will render the wall more flexible, but in instances where the lower portion 22 is relatively long, these projections may be omitted, because in such instances there will be sufficient bending of the wall to facilitate snapping the protuberances beneath the inner wall of the housing 14.

Figure 5:
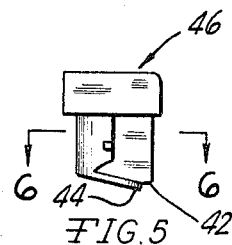
FIGURE 5 is a side elevational view of a vent device embodying another form of the present invention.
Figure 6:
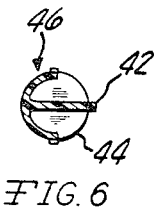
FIGURE 6 is a sectional view taken on the line 6—6 of FIGURE 5.

Referring now to FIGURES 5 and 6, a modified embodiment of the invention is illustrated. This embodiment is essentially the same as the embodiment illustrated in FIGURES 1-4, differing only in that the reinforcing panel 36 of the described embodiment has been elongated as shown at 42 so that it projects beyond the circumference of the lower wall 44. This projecting portion of the wall 42 is adapted to fit into a mating slot formed in the opening in the housing so as to prevent rotation of the vent device 46 in the opening. The projection 42 also assures that when installing the vent device 46 in the housing, the workmen will always be certain to align the vent device 46 in the proper direction so that it functions properly. In other respects the vent device 46 is the same as the vent device 10, and further description is not necessary.

Figure 7:
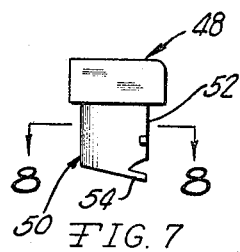
FIGURE 7 is a side elevational view of a vent device embodying still another form of the present invention.
Figure 9:
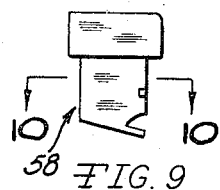
FIGURE 9 is a side elevational view of a vent device embodying still another form of the present invention.
Figure 4:
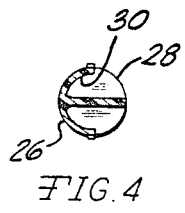
FIGURE 4 is a sectional view taken on the line 4—4 of FIGURE 3.
Figure 8:
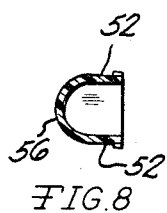
FIGURE 8 is a sectional view taken on the line 8—8 of FIGURE 7.
Figure 10:
FIGURE 10 is a sectional view taken on the line 10—10 of FIGURE 9.

Two additional embodiments are illustrated in FIGURES 7 and 8 and in FIGURES 9 and 10. The embodiment shown in FIGURES 7 and 8 provides a vent device 48 which does not require a center reinforcing panel because the lower portion 50 has forward extensions of its side walls identified by the reference numbers 52 which support the bottom wall 54, and these extensions 52, not being circular continuations of the rearward wall 56 will serve to prevent the device 48 from rotating in the opening of the housing, and also will function to assure that the workmen insert the vent device 48 in the proper position in the housing. It will be understood that when using the vent device 48, it will be necessary that the hole in the housing 14 be shaped to correspond to the cross-sectional configuration of the lower portion 50.

The embodiment in FIGURES 9 and 10 is substantially the same as that in FIGURES 7 and 8, but in this instance the lower portion 58 has a cross-sectional configuration which is square, and it will be required that the hole formed in the housing also have a square configuration. In other respects the embodiment is the same as that shown in FIGURES 7 and 8 and further description is not believed necessary.

From the foregoing descriptions of the various embodiments it will be understood that venting devices for a rear axle housing have been provided which are constructed and arranged so that they will not readily become clogged with lubricants and the like nor from contaminants from external sources. In each instance the upper and lower portions of the vent devices have the passageway passing therethrough opening in a direction away from the source of the contaminants or lubricants, thereby assuring an open passageway for breathing of the device. It is to be understood that the device can readily be inserted into the opening of the housing and that means are provided for locking the device in place in the housing and also for maintaining the device in the proper oriented position. The device is also characterized in being a rigid one-piece construction which can be manufactured economically.

Having thus described my invention, I claim:

1. A vent device adapted to fit in a hole in a housing comprising a lower portion adapted to be pressed into said hole, and an upper portion of enlarged transverse dimensions for seating on the external peripheral edge of said hole, said lower portion defining a vent passageway closed at the bottom and rearward side and open in a forward direction and communicating at its upper end with said upper portion, said upper portion defining a continuation of said vent passageway closed at the top and forward side and open in a rearward direction, and an upright reinforcing panel extending through said passageway into engagement with the closed bottom and top of said passageway.

2. A vent device according to claim 1, wherein said hole and lower portions are circular in cross-section.

3. A vent device according to claim 2, wherein said panel projects forward through the opening in said lower portion for engagement in a slot formed in the housing so as to prevent rotation of the device relative to the housing.

4. A vent device according to claim 1, wherein said hole and said lower portion are non-circular in cross section so as to prevent rotation of the device relative to the housing.

5. A vent device according to claim 1, wherein said lower portion has at least one external lateral projection spaced from said upper portion for engagement with the internal peripheral edge of said hole to retain the device in the hole.

6. A vent device according to claim 5, wherein the side wall of said lower portion adjacent to said lateral projection is notched to increase the lateral projection of the side wall to allow said projection to snap into retaining position.

References Cited

UNITED STATES PATENTS 1,915,249 6/1933 Jorgensen.
2,644,609 7/1953 Foss _____ 220—44

FOREIGN PATENTS 850,385 10/1960 Great Britain.

THERON E. CONDON, *Primary Examiner.*

GEORGE E. LOWRANCE, *Examiner.*